United States Patent [19]
Onishi et al.

[11] Patent Number: 5,814,580
[45] Date of Patent: Sep. 29, 1998

[54] THERMAL TRANSFER RECORDING MATERIAL

[75] Inventors: Akira Onishi; Noriyasu Kita; Noritaka Nakayama; Tatsuo Tanaka; Tawara Komamura, all of Hino, Japan

[73] Assignee: Konica Corporation, Japan

[21] Appl. No.: 608,285

[22] Filed: Feb. 28, 1996

[30] Foreign Application Priority Data

Mar. 10, 1995 [JP] Japan .................................... 7-051168
May 24, 1995 [JP] Japan .................................... 7-125234

[51] Int. Cl.$^6$ ............................ B41M 5/035; B41M 5/38
[52] U.S. Cl. .................... 503/227; 428/195; 428/913; 428/914
[58] Field of Search ................. 8/471; 428/195, 428/913, 914, 484; 503/227; 548/262.4, 331.5

[56] References Cited

U.S. PATENT DOCUMENTS

| | | | |
|---|---|---|---|
| 5,212,146 | 5/1993 | Komamura et al. | 503/227 |
| 5,227,359 | 7/1993 | Mikoshiba et al. | 503/227 |

FOREIGN PATENT DOCUMENTS

| | | | |
|---|---|---|---|
| 0 535 608 | 4/1993 | European Pat. Off. | 503/227 |
| 0616898A2 | 9/1994 | European Pat. Off. | 503/227 |

OTHER PUBLICATIONS

Patent Abstracts of Japan, Publication # JP705 3888, Publication date Feb. 28, 1995.
Patent Abstracts of Japan, Publication # JP60002398, Publication date Jan. 8, 1985.
Patent Abstracts of Japan, Publication # JP61031289, Publication date Feb. 13, 1986.

*Primary Examiner*—Bruce H. Hess
*Attorney, Agent, or Firm*—Jordan B. Bierman; Bierman, Muserlian and Lucas

[57] ABSTRACT

A thermal transfer recording material is disclosed, comprising an azomethine dye represented by the following formula and a metal ion-containing compound.

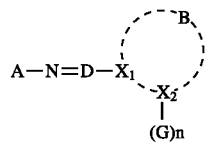

Formula

21 Claims, 1 Drawing Sheet

THERMAL TRANSFER RECORDING MATERIAL

FIELD OF THE INVENTION

The present invention related to a thermal transfer recording material excellent in light fastness and capable of forming an image with a sufficient density by using a chelate dye formed by the reaction of a azomethine dye with a metal ion-containing compound, and a thermal transfer recording method by using the recording material.

BACKGROUND OF THE INVENTION

As methods for obtaining a color hard copy, there have been studied color image recording techniques by the use of ink jet, electrophotography, silver halide photography or thermal transfer.

Among these, the thermal transfer recording method is advantageous in excellent gradation, easiness of the handling and maintenance, compactness of the device and a low running cost. A full-color image can be achieved by using a thermal transfer recording material having yellow, magenta and cyan ink layers, respectively.

In the thermal transfer recording method is important a dye employed in the thermal transfer recording material. The dye known in the art has a defect with respect to the image stability, such as poor fixability and light fastness.

To improve this defect, there was disclosed an image forming method in JP-A 59-78893, 59-109394 and 60-2398, in which a chelate dye was formed on an image-receiving material to obtain an image by using a chelatable, thermally diffusible dye (hereinafter, referred to as a post-chelate dye). The post-chelate dye described in the above disclosure enabled to improve the image stability. However, there are still problems regarding to color tone, chelating reactivity, molar absorption coefficient of the dye, storage stability of the dye in a ink sheet, suitability as ink (solubility) and light and heat fastness of a formed image, so that further improvements are still desired.

SUMMARY OF THE INVENTION

Accordingly, an object of the present invention is to provide a thermal transfer recording material and thermal transfer recording method, improved in the above problems.

The problems can be solved by the following constitutions.

(1) A thermal transfer recording material made by the combined use of an azomethine dye and a metal ion containing compound.

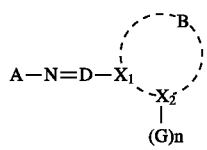

Formula (1)

In the formula, A represents an aromatic ring or heterocyclic ring; D represents a nitrogen-containing heterocyclic ring; B represents a non-metallic atom group necessary for forming an aromatic or heterocyclic ring. $X_1$ and $X_2$ each represent a carbon or nitrogen atom; and n is 1 when $X_2$ is a carbon atom and n is 0 when $X_2$ is a nitrogen atom. G represents a hydrogen atom, an amino group, hydroxy group, alkoxy group, acylamino group, alkylureido group, arylureido group, alkylsulfonamido group, arylsulfonamido group, alkylaminosulfonylamino group or arylaminosulfonylamino group.

(2) A thermal transfer recording material wherein an image is fixed by the reaction of the azomethine dye represented by the above-described formula (1) and the metal ion containing compound.

(3) A thermal transfer recording method comprising superposing a dye providing material containing the azomethine dye represented by the formula (1), on an image receiving material containing a metal ion-containing compound; heating according to an image information; and peel both materials.

(4) A thermal transfer recording method comprising superposing a thermal transfer recording material which comprises a support coated thereon an ink layer containing the azomethine dye represented by the formula (1) and a heat-fusible layer containing a metal ion-containing compound in this order, on an image receiving material so that the image receiving material is placed on the ink layer side; heating according to an image information; and peel apart both materials.

(5) A thermal transfer recording material and a thermal transfer recording method, wherein in the azomethin dye represented by the above-described formula (1), B represents a non-metallic atom group necessary for forming a nitrogen-containing heterocyclic ring and $X_2$ is a nitrogen atom adjacent to and bonded to $X_1$.

(6) The above-described thermal transfer recording material and thermal transfer recording method, wherein the dye represented by formula (1) is a azomethin dye selected from the following formulas (2) to (5).

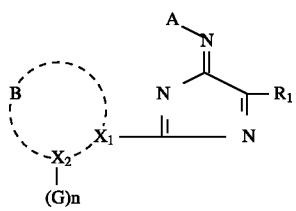

Formula (2)

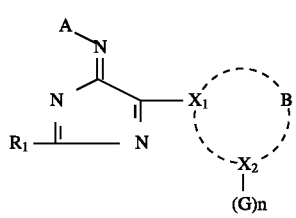

Formula (3)

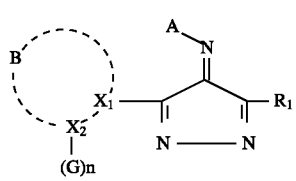

Formula (4)

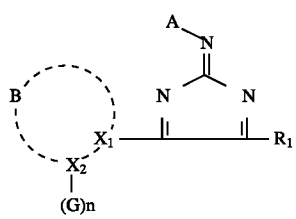

Formula (5)

In the formulas, A, B, $X_1$, $X_2$, n and G each have the same definition as in the afore-described formula (1) and $R_1$ represents a hydrogen atom or a univalent organic group.

(7) The above-described thermal transfer recording material and thermal transfer recording method, wherein the dye represented by formula (1) is a azomethin dye selected from the following formulas (6) to (9).

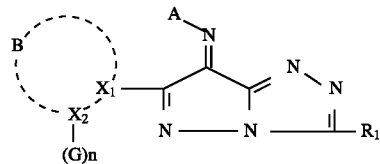

Formula (6)

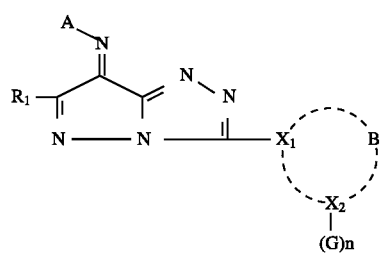

Formula (7)

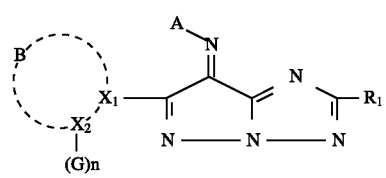

Formula (8)

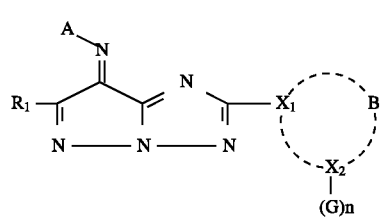

Formula (9)

In the formulas, A, B, $X_1$, $X_2$, n and G each have the same definition as in the afore-described formula (1). $R_1$ represents a hydrogen atom or a univalent organic group.

(8) The thermal transfer recording material and thermal transfer recording method as above-described, wherein the azomethine dye is represented by the following formula (10).

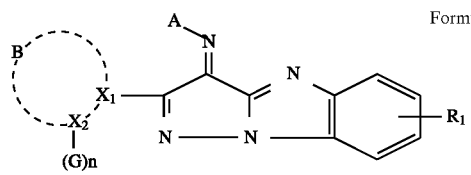

Formula (10)

In the formula, A, B, $X_1$, $X_2$, n and G each have the same definition as in the afore-described formula (1). $R_1$ represents a hydrogen atom or a univalent organic group.

(9) The thermal transfer recording material and thermal transfer recording method as above-described, wherein the azomethine dye is represented by the following formula (11).

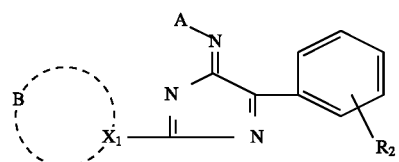

Formula (11)

In the formula, A and $X_1$ each have the same definition as in the afore-described formula (1). B' represents a nitrogen-containing heterocyclic ring and $R_2$ represents a hydrogen atom or a univalent organic group.

(10) The above-described thermal transfer recording material and thermal transfer recording method, wherein the dye represented by formula (1) is a azomethin dye selected from the following formulas (12) to (17).

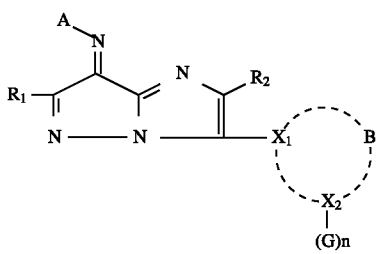

Formula (12)

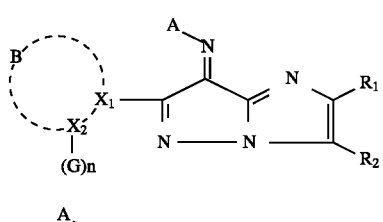

Formula (13)

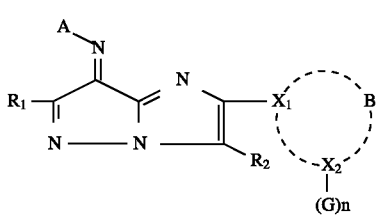

Formula (14)

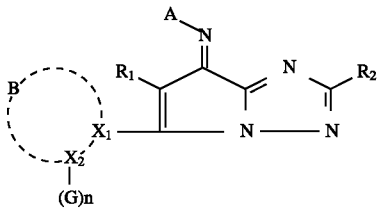

Formula (15)

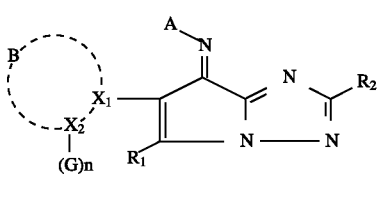

Formula (16)

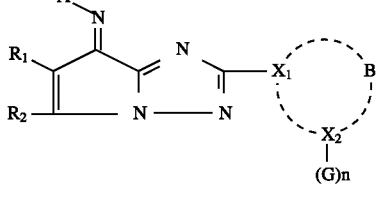

Formula (17)

In the formulas, A, B, $X_1$, $X_2$, n and G each have the same definition as in the afore-described formula (1). $R_1$ and $R_2$ represent a hydrogen atom or a univalent organic group.

In the present invention, a sufficient high density (maximum density) and an image excellent in image stability were accomplished by the combined use of an azomethine dye excellent in the stability in a dye-providing material and represented by formula (1) and a metal ion-containing compound.

DETAILED EXPLANATION OF THE INVENTION

Figure 1:
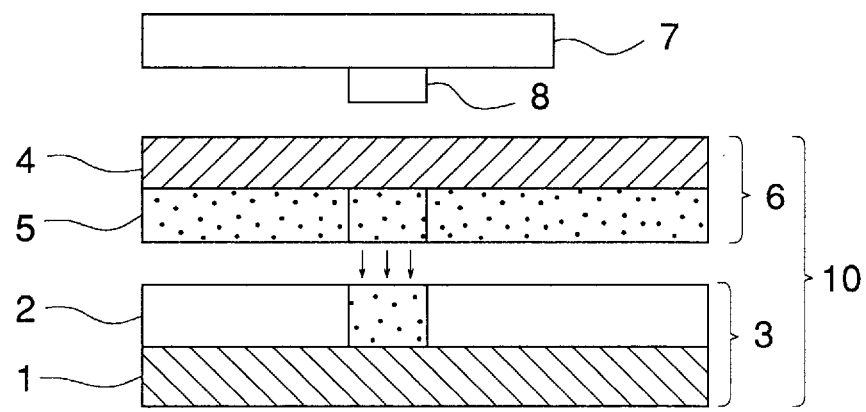
FIGS. 1(a) and 1(b) show a schematic section of a thermal transfer recording material of the present invention.
Figure 1:
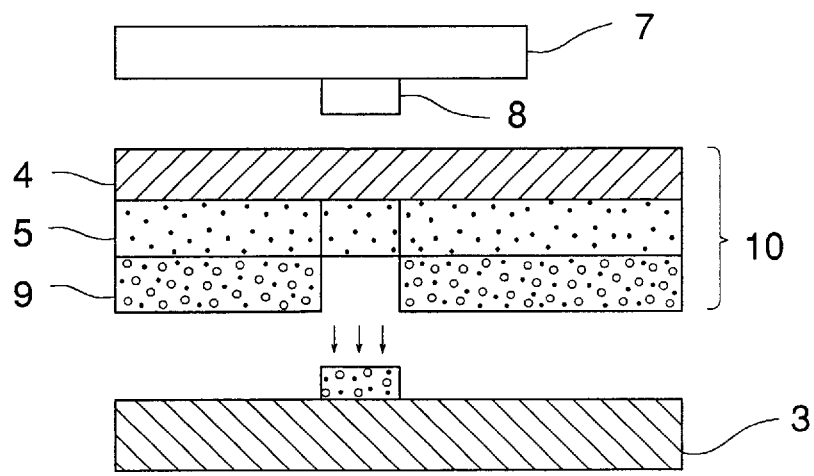

In the invention, a thermal transfer recording material is referred to one including a dye providing material and a image receiving material.

In the azomethine dye represented by formula (1), an aromatic ring and heterocyclic ring represented by A include preferably a phenyl group, pyridyl group, pyrimidyl group, pyrazinyl group and pyridazinyl group, and more preferably a phenyl group and pyridyl group.

As examples of the phenyl group of A are cited a 4-hydroxyphenyl group, 4-methylaminophenyl group, 4-(N-ethylamino)phenyl group, 4-(N,N-dimethylamino)-2-methylphenyl group, 4-(N-ethyl-N-2-methoxyethylamino)-2-methylphenyl group, 4-(N-ethyl-N-2-methanesulfonamidoethylamino)-2-methylphenyl group, 4-(N-ethyl-N-2-hydroxyethylamino)-2-methylphenyl group, 4-(N,N-diethylamino)-2-acetoamidophenyl group, 4-anilinophenyl group, 4-acetoamidophenyl group, 2,4-dinitrophenyl group, 2-cyano-2-nitrophenyl group, 2,4,5-tricyanophenyl group, 2-methylsulfonyl-4-nitrophenyl group and 2,6-dicyano-4-nitrophenyl group.

As examples of the pyridyl group of A are cited 3-(2-methyl-6-N,N-diethylamino)-pyridyl group, 2-(3-methyl-6-N,N-diethylamino)-pyridyl group, 3-(6-N,N-dimethylamino)-pyridyl group, 2-(5-hydroxy)pyridyl group, 2-(5-methoxy)pyridyl group, 3-(6-methoxy)pyridyl group, 3-(6-hydroxy-2-methyl)pyridyl group and 2-(3-methyl-5-diethylamino)pyridyl group. Among these, are preferable a pheny or pyridyl group having N, N-disubstituted-amino group.

The nitrogen containing heterocyclic ring represented by D above-described is a 5 or 6-membered nitrogen containing heterocyclic ring, which may be a condensed ring. As preferable examples thereof are cited an imidazole ring, pyrazolotriazole ring, pyrazolobenzimidazole ring, pyrazoloimidazole, pyrrolotriazole, pyrrolopyrazole ring, pyrroloimidazole ring and pyrazolotetrazole ring.

The afore-described B represents a non-metallic atom group necessary for forming an aromatic or heterocyclic ring. The aromatic ring includes a benzene ring and a naphthalene ring. As examples of the heterocyclic ring are cited a pyridine ring, pyrazole ring, imidazole ring, pyrimidine ring and quinoline. The aromatic ring and heterocyclic ring may be substituted by a substituent. As examples of the substituent are cited a halogen atom such as fluorine atom or chlorine atom; an alkyl group such as methyl, ethyl, butyl, pentyl, 2-methoxyethyl, trifluoromethyl or 2-ethylhexyl; an aryl group such as phenyl, p-tolyl or naphthyl; an acyl group such as acetyl, propionyl, or benzoyl; an alkoxy group such as methoxy, ethoxy or butoxy; an alkoxycarbonyl group such as methoxycarbonyl or i-propoxycarbonyl; an acyloxycarbonyl group such as acetyloxy or ethylcarbonyloxy; a carbamoyl group such as methylcarbamoyl, ethylcarbamoyl, butylcarbamoyl or phenylcarbamoyl; a sulfamoyl group such as sulfamoyl, methylsufamoyl, dimethylsulfamoyl or phenylsulfamoyl; an alkylthio group such as methylthio, ethylthio or octylthio; an arylthio group such as phenylthio or p-tolylthio; an amino group such as amino, methylamino, diethylamino or methoxyethylamino; an acylamino group such as acetylamino, chloroacetylamino, propionylamino, benzoylamino or trifluoroacetylamino; an alkylureido group such as methylureido, ethylureido, methoxyethylureido or dimethylureido; an arylureido group such as phenylureido; an alkylsulfonamido group such as methanesulfonamido, ethanesulfonamido, butanesulfonamido, trifluoromethylsulfonamido or 2,2,2-trifluoroethylsulfonamido; an arylsulfonamido group such as phenylsulfonamido or tolylsulfonamido; an alkylaminosulfonylamino group such as methylaminosulfonylamino or ethylaminosulfonylamino; an arylaminosulfonylamino group such as phenylaminosulfonylamino; a hydroxy group; a cyano group; nitro group; a heterocyclic group such as pyridyl, pyrazolyl, imidazolyl, furyl or thienyl.

As the univalent organic group represented by $R_1$ and $R_2$ of formulas (2) to (17) of the azomethine dye are cited groups which are the same one cited as substituents of an aromatic ring or heterocyclic ring formed through the B afore-described. The $R_1$ and $R_2$ maybe a non-metallic atom group necessary for forming an aromatic or heterocyclic ring formed through the B.

G represents a hydrogen atom; amino group such as amino, methylamino, diethylamino or methoxyethylamino; hydroxy group; alkoxy group such as methoxy, ethoxy or methoxyethoxy; acylamino group such as acetylamino, chloroacetylamino, propionylamino, benzoylamino or trifluoroacetylamino; alkylureido group such as methylureido, ethylureido, methoxyethylureido or dimethylureido; arylureido group such as phenylureido; alkylsulfonamido group such as methanesulfonamido, ethanesulfonamido, butanesulfonamido, trifluoromethylsulfonamido or 2,2,2-trifluoroethylsulfonamido; arylsulfonamido group such as phenylsulfonamido or tolylsulfonamido; alkylaminosulnylamino group such as methylaminosulfonylamino or ethylaminosulfonylamino; arylaminosulfonylamino group such as phenylaminosulfonylamino.

As a preferable azomethine dye represented by formula (1), B represents a nonmetallic atom group necessary for forming a nitrogen-containing heterocyclic ring and $X_2$ is a nitrogen atom, which is contiguously bonded to $X_1$. The heterocyclic ring formed through B includes a pyridine ring, pyrazole ring, imidazole ring and quinoline ring.

Further, D is preferably a imidazole ring, pyrazcle ring, pyrazolotriazole ring, pyrazolobenzimidazole ring, pyrazoloimidazole ring or pyrrolotriazole ring. In the case where D is a imidazole ring, is preferable an azomethine dye represented by formula (11). In the formula (11), a nitrogen-containing heterocyclic ring formed through B' is preferably a pyridine ring, pyrazole ring, imidazole ring, pyrimidine ring or quinoline ring; and $R_2$ is preferably a halogen atom such as fluorine atom or chlorine atom; alkyl group such as methyl, ethyl, butyl, pentyl 2-methoxyethyl, trifluoromethyl or 2-ethylhexyl; acyl group such as acetyl, propionyl or benzoyl; alkoxy group such as methoxy, ethoxy or butoxy; acyloxy group such as acetyloxy or ethylcarbonyloxy; and alkylthio group such as methylthio, ethylthio or octylthio.

Examples of the azomethine dye represented by formula (1) are shown as follows, but the present invention is not limited thereto.

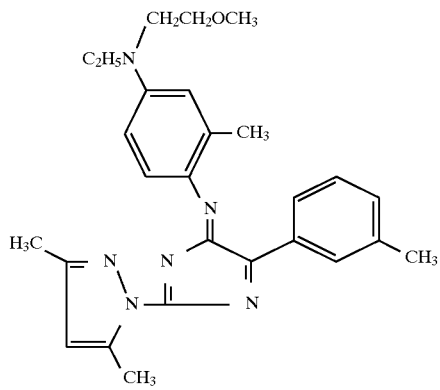
D-1
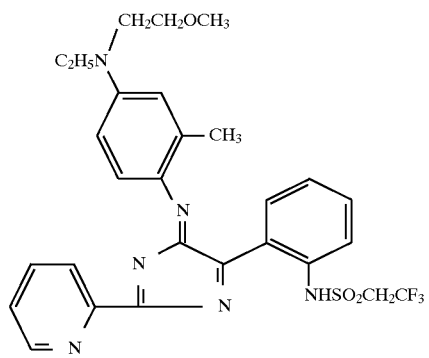
D-2
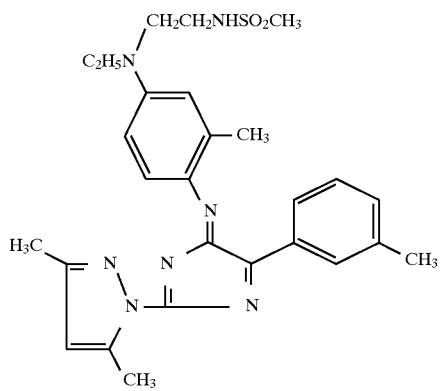
D-3
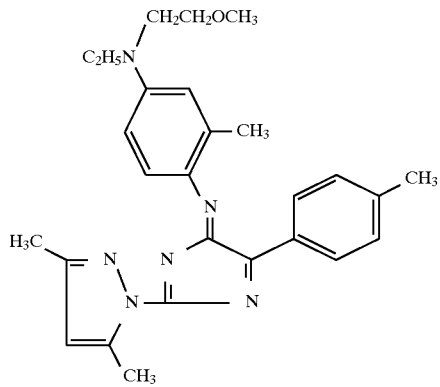
D-4

-continued
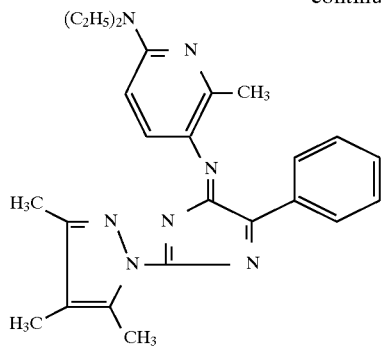
D-5
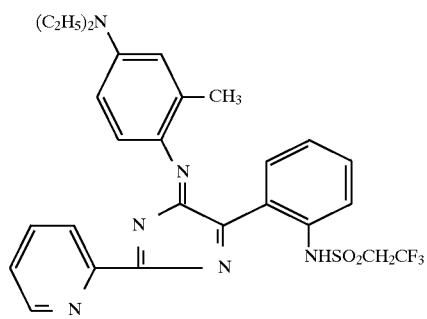
D-6
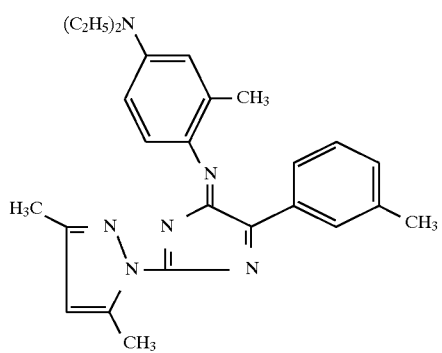
D-7
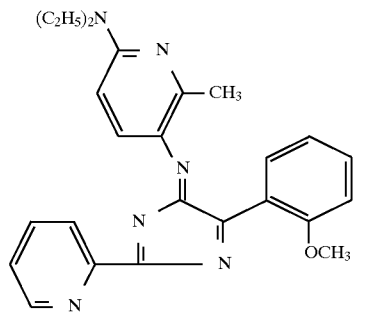
D-8
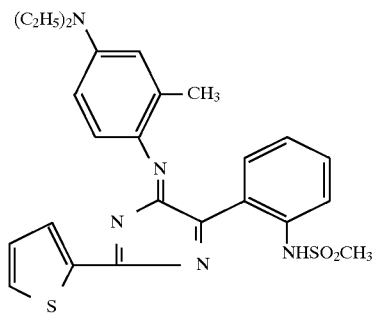
D-9

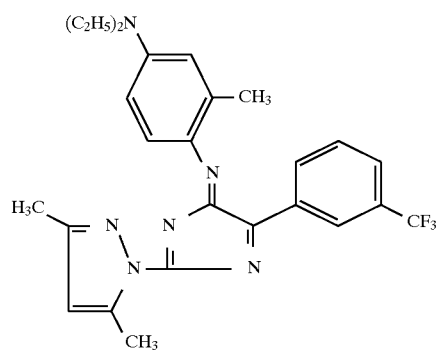
D-10
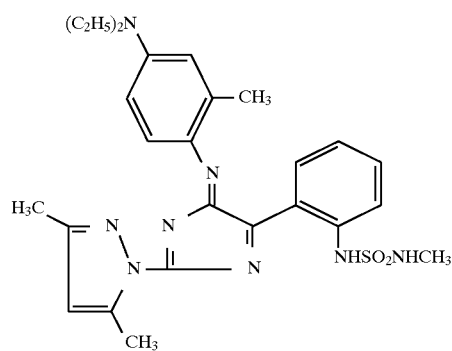
D-11
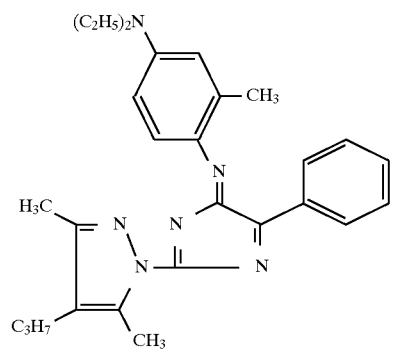
D-12
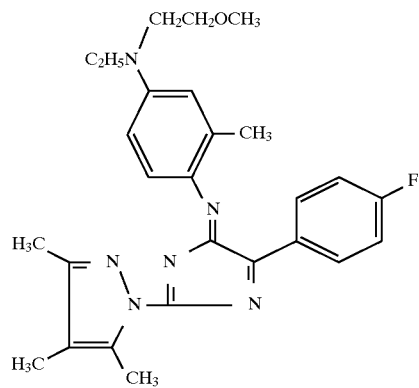
D-13

-continued
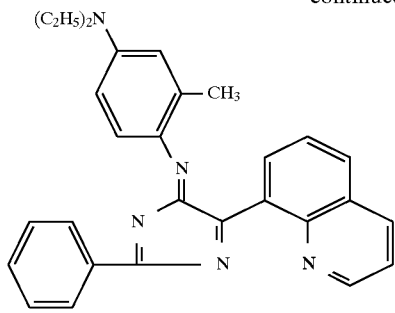
D-14
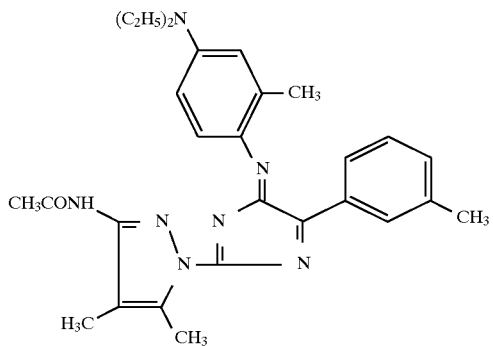
D-15
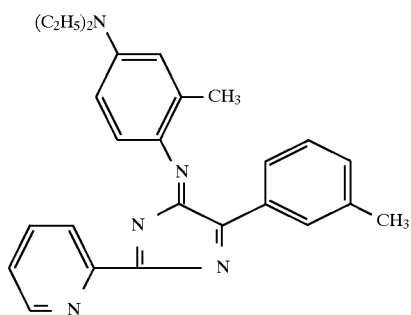
D-16
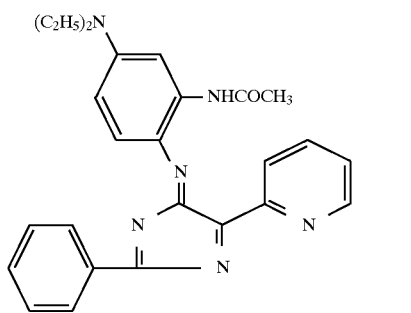
D-17
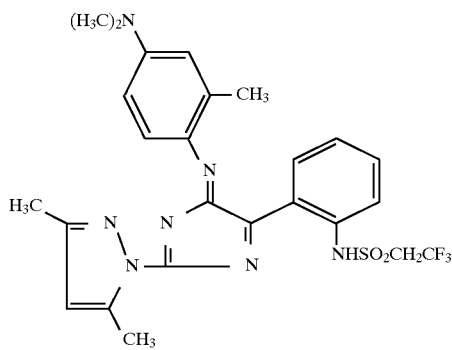
D-18

-continued
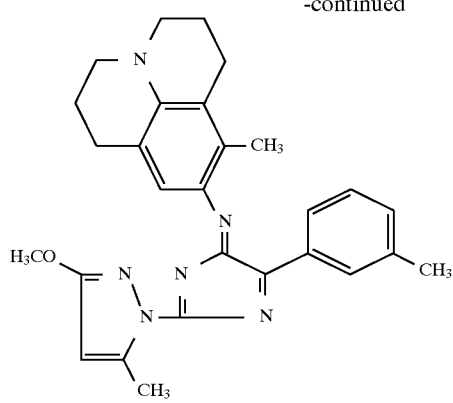
D-19
D-20
D-21
D-22
D-23

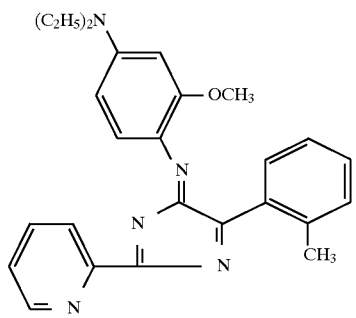
D-24
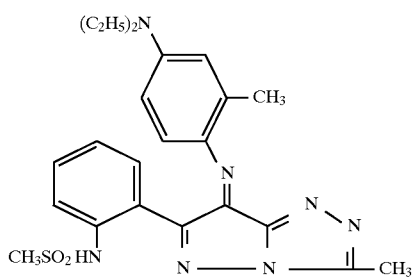
D-25
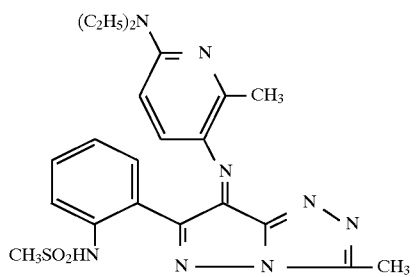
D-26
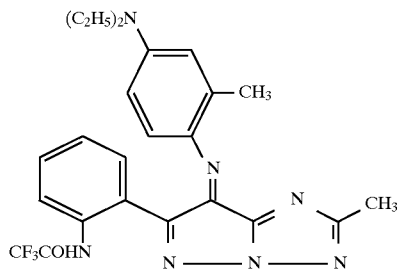
D-27
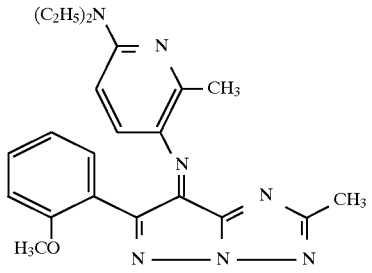
D-28

-continued
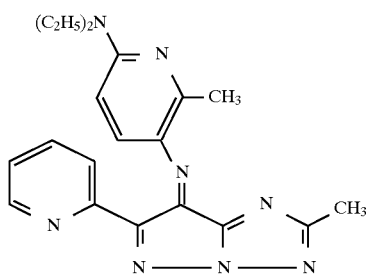 D-29
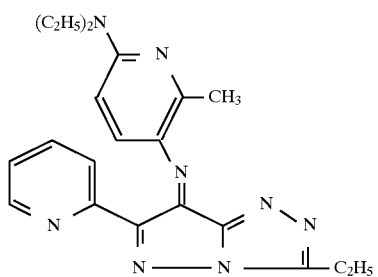 D-30
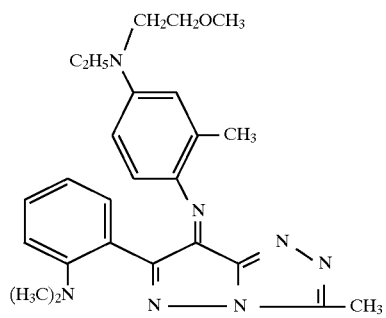 D-31
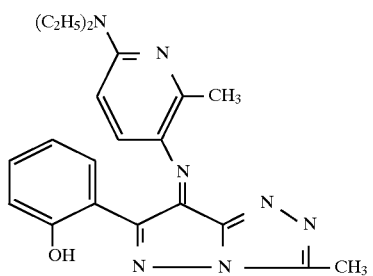 D-32
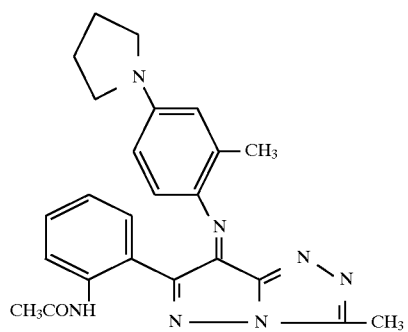 D-33

-continued
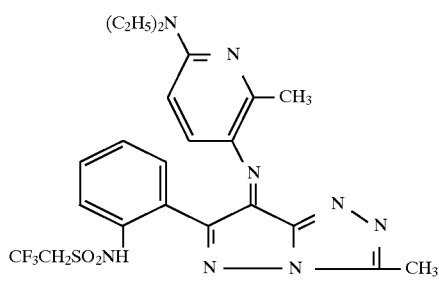
D-34
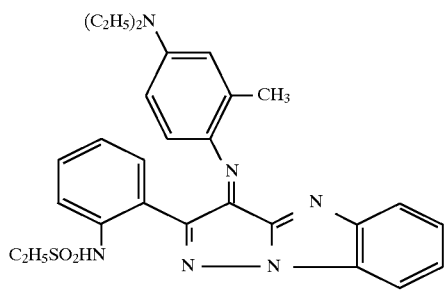
D-35
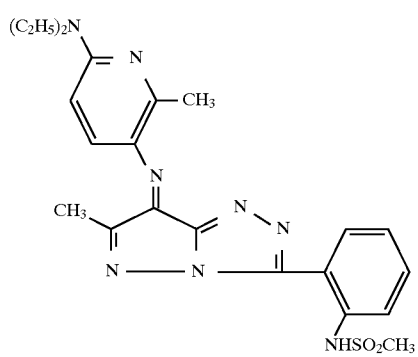
D-36
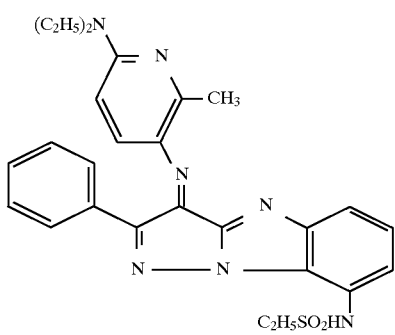
D-37
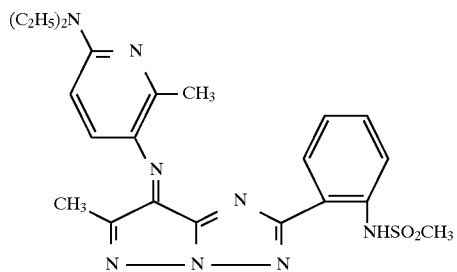
D-38

-continued
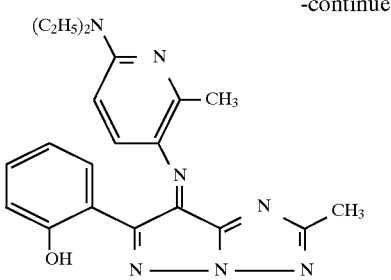
D-39
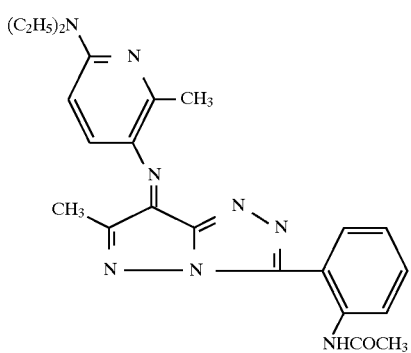
D-40
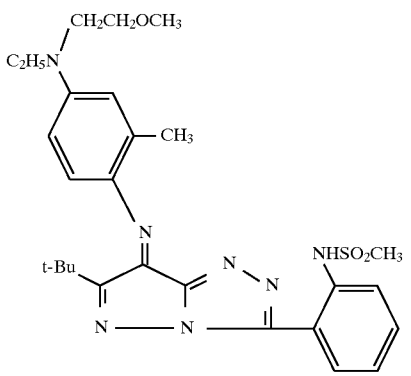
D-41
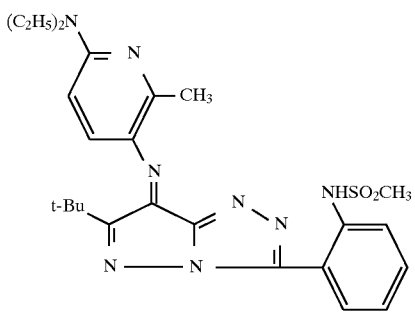
D-42
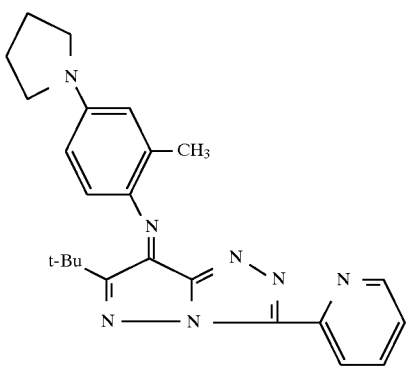
D-43

-continued
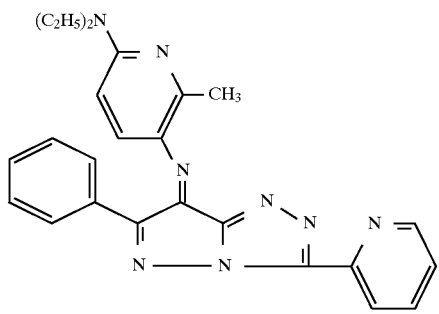
D-44
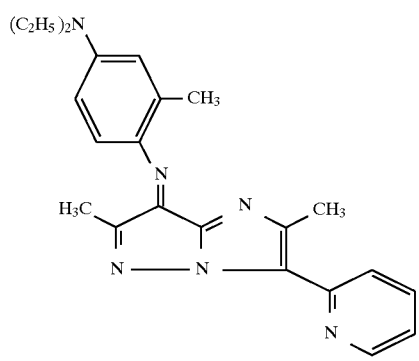
D-45
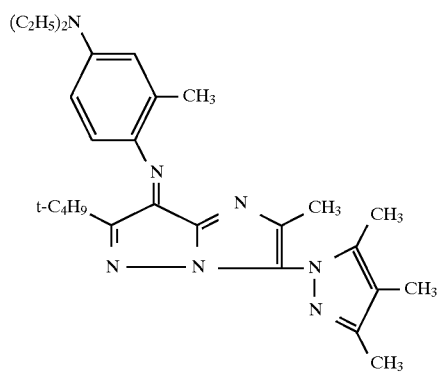
D-46
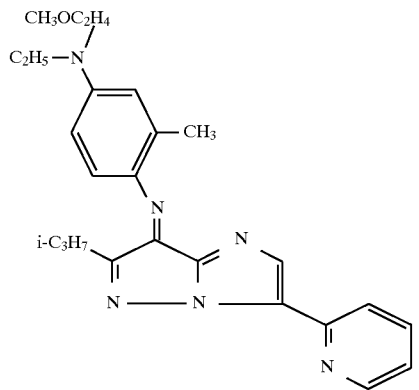
D-47

-continued
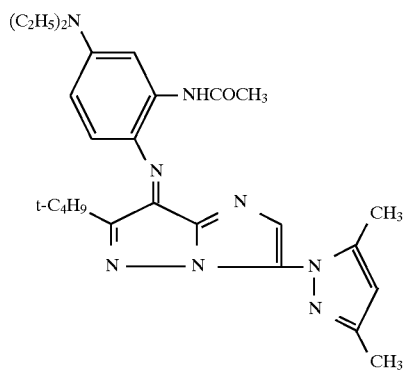
D-48
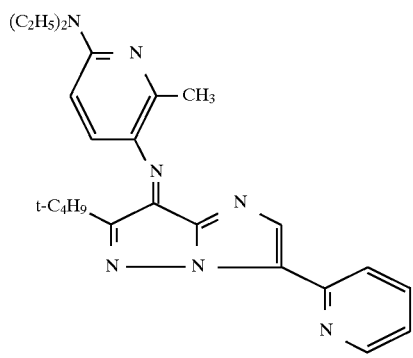
D-49
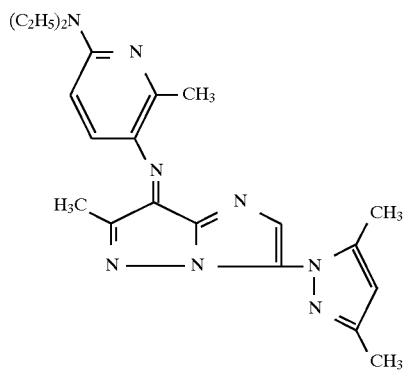
D-50
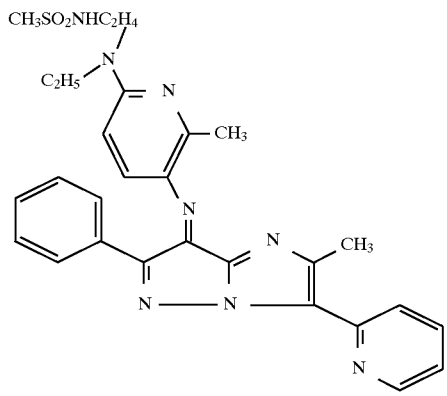
D-51

-continued
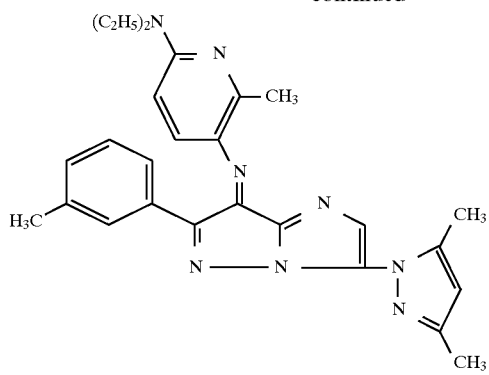
D-52
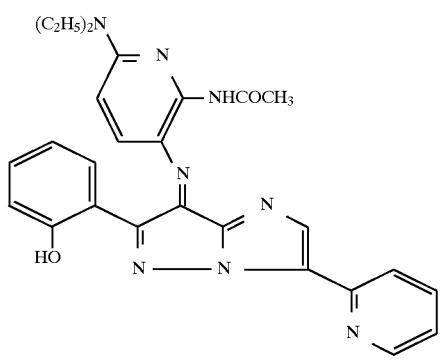
D-53
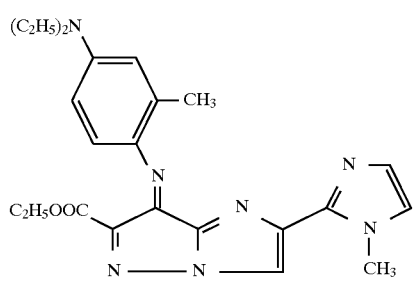
D-54
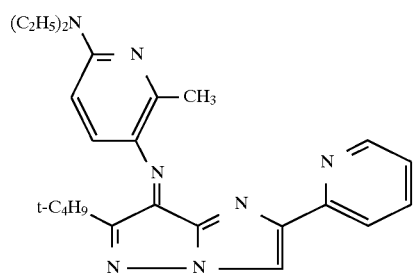
D-55
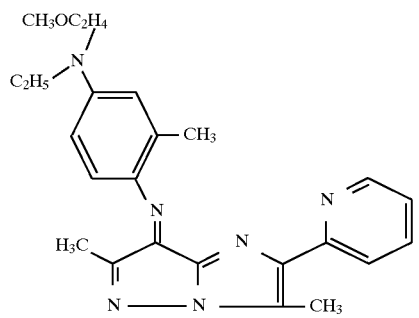
D-56

-continued
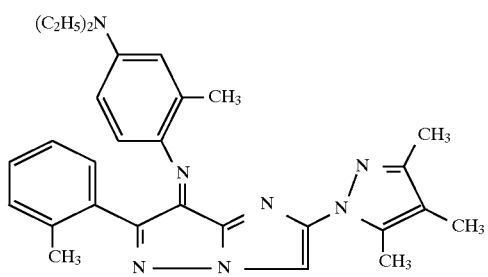
D-57
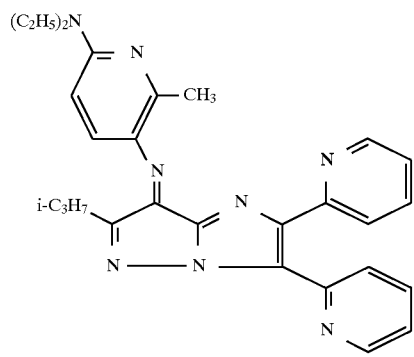
D-58
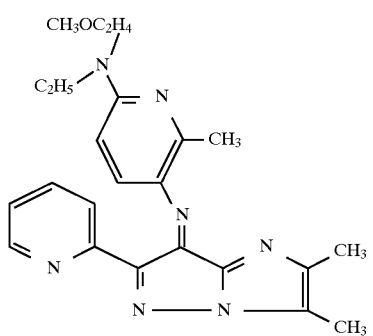
D-59
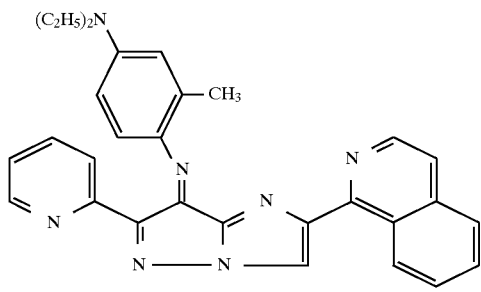
D-60
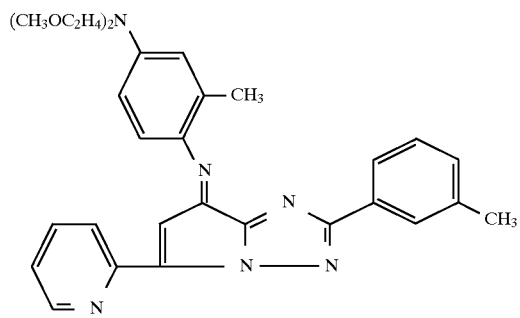
D-61

-continued
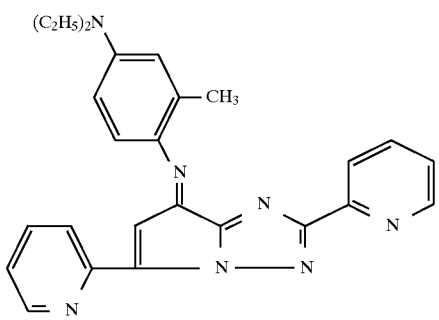
D-62
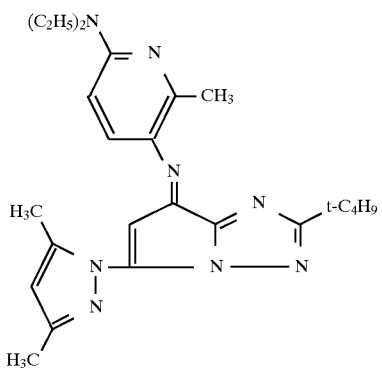
D-63
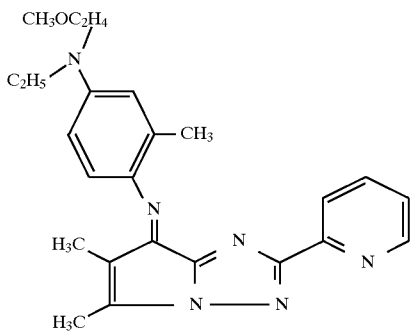
D-64
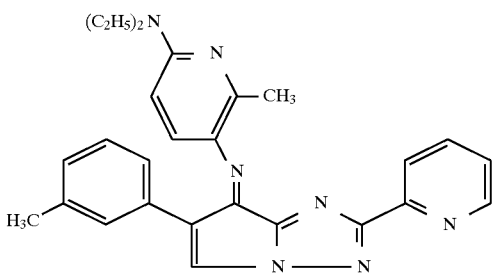
D-65
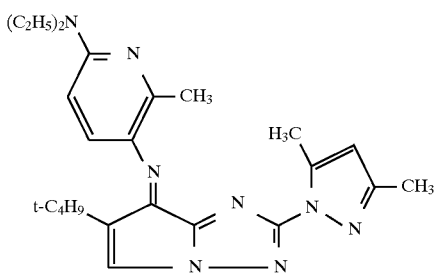
D-66

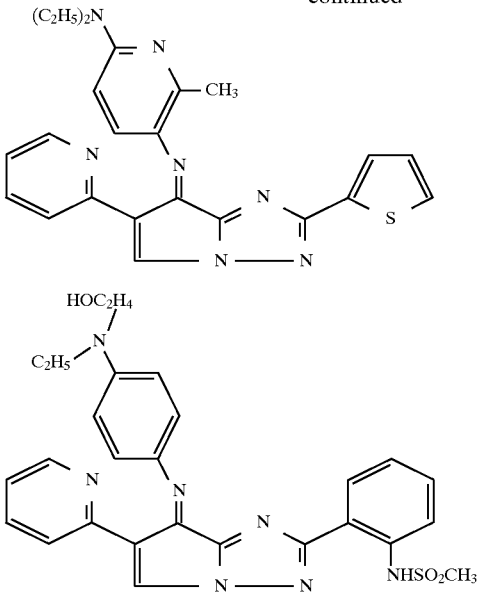

D-67

D-68

These dyes can be readily synthesized in accordance with methods known in the art. A nitrogen-containing heterocyclic ring, D which is substituted by a ring formed through B, can be synthesized inaccordance with methods as described in U.S. Pat. Nos. 3,061,432, 3,725,067, 4,500,630 and 4,540,654, J. Heterocyclic Chem. vol. 10, page 411 (1973) and Synthesis page 414 (1973). The azomethine dye represented by formula (1) can be synthesized in accordance with an oxidative coupling method, as described in JP-A 63-113077, 3-275767, 4-13774 and 4-89287. An example of the synthesis thereof is shown as below.

Example (Synthesis of exemplified dye, D-7)

(i) To 850 ml of ethanol were added 188 g of aminoguanidine hydrochloride and 170 g of 2,4-pentadione and the mixture was heated with stirring for 3 hrs. under reflux. The precipitated crystals were filtered, sufficiently washed with ethanol and dried to obtain 1-amidino-3,5-dimethylpyrazole hydrochloride of 210 g. Next, 60 g of potassium hydroxide was dissolved in water of 120 g and 1-amidino-3,5-dimethylpyrazole hydrochloride of 61.1 g was added thereto withcooling with water and stirred further for 1 hr. Chloroform of 200 ml was added to the solution for extraction. A chloroform layer was separated, washed with water and dried with anhydrous sodium sulfate, thereafter, chloroform was removed to obtain 1-amidino-3,5-dimethylpyrazole of 46.0 g.

(ii) To 150 ml 0f chloroform were added 42.2 g of 1-amidino-3,5-dimethylpyrazole and 17.0 g of 2-brom-3'-methylacetophenone and the mixture was stirred for 1 hr. at a room temperature, then, further heated for 1 hr. under reflux. The reaction mixture was cooled and poured into water of 150 ml. After a chloroform layer was separated, chloroform was removed by distilation. To the residue were added acetonitnile and a small amount of distilled water, and precipitated crystals were filtered, sufficiently washed with water and dried to obtain 4-(3-methylphenyl)-2-(3,5-dimethylpyrazolyl)imidazole of 11 g.

(iii) To 200 ml of ethanol were added 4-(3-methylphenyl)-2-(3,5-dimethylpyrazolyl)imidazole of 7.57 g, N,N-diethyl-3-methyl-p-phenylenediamine hydrochloride of 7.09 g and triethylamine of 21.2 g with stirring and thereto was added dropwise ammonium persulfate of 14.4 g which was dissolved in distilled water of 60 ml with cooling with water.

After completing the addition, the mixture was further stirred for 3 hrs. at room temperature. Distilled water of 150 ml was added thereto with stirring and the resulting precipitate was refined by a column chromatograph and dried to obtain a dye of 5.1 g.

The dye was shown to exhibit an absorption maximum at 620 nm in a acetone solution thereof.

A dye providing material used in the present invention comprises a support provided thereon an ink layer (thermal transfer layer) containing an azomethine dye represented by formula (1). The azomethine dye may be used singly or in combination of two or more thereof. Another kind of a dye such as a azo dye, anthraquinone type dye or arylidene type dye may be added thereto. The azomethine dye of formula (1) is contained in the ink layer in an amount of 0.05 to 10 g per $m^2$ of the support.

The azomethine of formula (1) or a mixture thereof with another dye is dissolved in a solvent or dispersed in the form of fine particles dispersed in a solvent, with a binder to obtain an ink solution. This solution is coated on a support and optimally dried to form an ink layer.

To the ink solution, there may be optionally added an organic or inorganic fine particles which is incapable of being sublimed, a dispersing agent, an antistatic agent, an antiforming agent, antioxidant or a viscosity-adjusting agent. The thickness of the ink layer is preferably 0.1 to 10 μm.

As the binder are preferable solvent-soluble polymers such as an acrylate resin, methacrylate resin, polystylene, polycarbonate, polysulfone, polyethersulfone, polyvinyl butyral, polyvinyl actal, nitrocellulose and ethylcellulose. These binder, singly or in combination, may be dissolved in a solvent or dispersed in the form of a latex. The amount of the binder to be used is preferably within a range of 0.1 to 20 g per $m^2$ of the support.

As examples of the solvent to be used in the ink solution are cited alcohols such as ethanol and propanol; cellosolves such as methylcellosolve, aromatics such as toluene and xylene; esters such as ethylacetate; ketones such as acetone and methylethylketone; ethers such as tetrahydroxyfuran and dioxane.

A support used in the invention is not limitative, if it is excellent in the dimensional stability, and having resistance to heating by a thermal head. There are preferably employed thin paper such as condenser paper or glassine paper and heat-resistant plastic resin such as polyehtyleneterephthalate, polyamide or polycarbonate.

The thickness of the support is preferably 2 to 30 μm. The support may be provided with a sublayer for the purpose of improving adhesibility to the binder or preventing the dye from being transferred to the side of the support or dyeing. The support may be provided, on the other side (opposite side to the ink layer), a slipping layer for the purpose of preventing the thermal head from being adhered to the support.

In the case where a thermal transfer recording material of the present invention is applied to a thermal transfer recording material capable of recording a full-color image, a cyan thermal transfer layer containing a cyan dye, a magent thermal transfer layer containing a magenta dye and a yellow thermal transfer layer containing a yellow dye each are coated on the support. There may be optionally coated four layers including a thermal transfer layer containing a black image-forming material.

Next, a metal ion containing compound will be explained in detail.

The metal ion containing compound may be contained in a image-receiving layer provided on a support different from that of the dye providing material, or in a heat-fusible layer provided on the ink layer. As the metal ion containing compound are cited organic or inorganic salt of the metal ion and a complex thereof; and among these is preferable organic acid salt or complex of the metal ion. As a metal constituting the metal ion containing compound are cited monovalent or polyvalent metals belonging to the I through VIII groups of the periodcal table of elements; among these are preferable Al, Co, Cr, Cu, Fe, Mg, Mn, Mo, Ni, Sn, Ti and Zn; more preferably, Ni, Co, Cr, Cu, and Zn. As examples of the metal ion containing compound are cited salts of a metal ion such as aliphatic acid salts $Ni^{2+}$, $Cu^{2+}$, $Cr^{2+}$, $Co^{2+}$ or $Zn^{2+}$ and an aliphatic acid such as acetic acid or stearic acid, salts of the metal ion and an aromatic acid such as benzoic acid or salicylic acid. Further, a complex represented by the following formula M is particularly preferable.

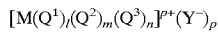

$$[M(Q^1)_l(Q^2)_m(Q^3)_n]^{P+}(Y^-)_p \qquad \text{Formula M}$$

In the formula, M is a metal ion, preferably $Ni^{2+}$, $Cu^{2+}$, $Cr^{2+}$, $Co^{2+}$ or $Zn^{2+}$. $Q^1$, $Q^2$ and $Q^3$ each represent a compound capable of being coordinated to the metal ion, which may the same with or different from each other. These compompounds are selected from the coordination compounds described in, for example, "Chelate Chemistry" published by Nankodo.

$Y^-$ represents an anion and examples thereof are cited tetraphenyl borate anion and alkylbenzenesulfonic acid anion.

Each of l, m and n represents an integer of 0 to 3, depending on the complex represented by formula M being four-coordinated or six-coordinated, or on the coordination number of $Q^1$, $Q^2$ and $Q^3$. P is 1 or 2.

Among the complex represented by formula M, is preferable a complex represented by the following formula (M-1).

$$M^{2+}(Y^-)_2 \qquad \text{Formula (M-1)}$$

In the formula, $M^{2+}$ represents a bivalent transition metal ion. $Y^-$ represents a compound capable of forming a coplex with the bivalent metal ion, which is represented by the following formula (M-2).

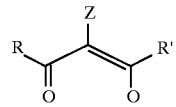

Formula (M-2)

In the formula, Z represents an alkyl group, aryl group, aryloxycarbonyl group, alkoxy group, alkoxycarbonyl group, halogen atom or hydrogen atom. R and R' represent an alkyl group or aryl group, which may be the same with or different from each other, and R and Z or R' and Z may combine with each other to form a ring, provided that, when Z is a hydrogen atom, Rand R' are simultaneously a methyl group.

The addition amount of the metal ion containing compound is preferably 0.5 to 20 g/m², 1 to 15 g/m² of the image receiving layer or heat-fusible layer.

The image receiving material used in the invention comprises a support such as paper, plastic resin film or composite of paper and plastic resin, having thereon a polymer layer as an image receiving layer comprising polyester resin polyvinyl chloride resin, copolymer resin of vinyl chloride and other monomer such as vinyl acetate, polyvinyl butyral, polyvinyl pyrroridone, polycarbonate or a combination thereof.

The image receiving material may contain, in the image receiving layer, optionally an antioxidant or mold lubricant. A protective layer may be provided on the image receiving layer and an interlayer may be provided between the support and image receiving layer for the purpose of adhesion, heat insulation or cushion effect. On the other side of the support (opposite side to the image receiving layer), there may be provided an antistatic layer or backing layercontaining organic or inorganic fine particles for prevention from blocking. The image receiving layer may be provided on both sides of the support. The support itself can be used as an image receiving material.

The thermal transfer recording material used in the thermal transfer recording method of the invention may have a heat-fusible layer containing a heat-fusible compound on the thermal transfer layer for the purpose of use, as the image receiving material, plain paper with no image receiving layer, as described in JP-A 59-106997. As the heat-fusible compound is preferably used a colorless or white compound having a melting point of 65° to 150° C. such as carnauba wax, bees wax and candelilla wax. The heat-fusible layer containing a heat-fusible compound may further contain a polymer such as polyvinyl pyrrolidone, polyvinyl butyral, polyester or polyvinyl acetate.

In the thermal transfer recording method of the invention, heating is generally made by means of a thermal head and it may be made by electro-heating or laser.

The heating maybe made by the thermal head from the back-side of a dye-providing material or thermal transfer material, or the back-side of an image receiving material. Considering a dye transfer speed and an image density, heating is preferably made from the back-side of the dye providing material.

In the thermal transfer recording material of the invention, it is preferable that the dye providing material contains, in an ink layer, the metal ion containing compound or in combination with the azomethine dye of formula (1) in the form of micro-capsules to prevent the azomethine dye and metal ion containing compound from causing chelation with each other at the non-heating state.

Next, an embodiment of the thermal transfer recording method of the invention is explained with reference to FIG. 1 (a) and (b).

In a thermal transfer recording material of FIG. 1(a), an image receiving material (3) comprises a support (1) provided thereon an image receiving layer (2) containing a metal ion containing compound and a dye providing material (6) comprises a support (4) provided thereon an ink layer (5) containing an azomethine dye represented by formula (1). The image receiving material and dye providing material each may be provided with an interlayer between the image receiving layer or ink layer and the support. A thermal transfer recording method is achieved by the step of superposing the dye providing material (6) on the image receiving material (3); heating imagewise by a heating resistor (8) held in a thermal head (7) from the back-side of the dye providing material (6) and subsequently peeling apart both materials. At that time, the reaction of the azomethine dye contained in the ink layer (5) with the metal ion containing compound contained in the image receiving layer (2) produces a chelate dye to form a colored image.

In a thermal transfer recording material of FIG. 1(b), an image is formed by the steps of superposing a thermal transfer recording material (10) having, on the dye providing material (6) of the thermal transfer recording material as shown in the above (a), a heat-fusible layer (9) containing a metal ion-containing compound on a image receiving material (3) with no image receiving layer, such as plain paper; using the thermal head (7) in the same manner as in the thermal transfer recording method as shown in FIG. 1(a); and then peeling apart both materials to form an image. The thermal transfer recording method of this case is different from one as shown in the above (a) in the point that, upon heating by the thermal head (7), a chelate dye is formed by the reaction of the azomethine dye with the metal ion-containing compound between the ink layer (5) and heat-fusible layer (9) of the thermal transfer recording material (10); thereafter, an image is formed on the image receiving material (3).

In the present invention, there is used the azomethine dye represented by formula (1), which is excellent in storage stability in the dye providing material, so that an image with a high density and superior in the image stability can be achieved efficiently.

EXAMPLES

The present invention will be explained based on examples, but the invention is not limited these embodiments.

Example 1

Preparation of ink

A homogeneous ink solution containing an azomethine dye represented by formula (1) of the invention was prepared by mixing the following materials. Solubilities of the azomethine dyes were sufficiently high and ink properties were also excellent.

| | |
|---|---|
| Azomethine dye D-1 | 1.2 g |
| Polyvinyl acetal resin (KY-24, product by Denki Kagaku) | 2.3 g |
| Methyl ethyl ketone | 53 g |
| Toluene | 22 g |
| Silicon-modified urethane resin (SP-2105, product by Dainichiseika) | 1.8 g |

Preparation of dye providing material

The above-described ink was coated on a polyethylene terephthalate base (hereinafter, referred to as PET base) using a wirebar so as to have a coating weight 2.0 g/m² and dried to prepare a dye providing material-1 comprising a PET base provided thereon an ink layer. Drying was conducted preliminarily by a drier and further in a oven at 70° C. over a period of 15 min. The PET base was provided, on the back-side thereof, a nitrocellulose layer containing a silicon-modified urethane resin (SP-2105, product by Dainichiseika), as an anti-sticking layer.

Preparation of image receiving layer

On a synthetic paper with a thickness of 150 μm (product name: Yupo FPG-150, product by Oji Yuka), as an image receiving layer, polyvinyl butyral resin (S-LEC BX-1, product by Sekisui Kagaku) containing ester-modified silicone (X-24-8300, product by Shinetsu Kagaku, coating weight; 0.3 g/m²) and a metal ion-containing compound as shown below (coating weight, 2 g/m²) so as to have a coating weight of 6 g/m² and subjected to drying to obtain an image receiving material-1. The drying was conducted preliminarily in a drier and further in an oven at 100° C. over a period of 15 min.

Metal ion-containing compound

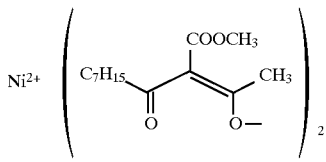

Method for thermal transfer recording

The dye providing material-1 was superposed on the image receiving material-1 and a thermal head was made contact with the back-side of the dye providing material to conduct image recording at the following conditions to obtain an image-1 excellent in gradation.

Recording conditions:

Recording density of main and sub-scanning: 8 dots/mm

Recording power: 0.6 W/dot

Heating time: the time was adjusted stepwise within a range of 0.2 to 20 msec.

Thus-obtained image-1 was evaluated with respect to a maximum density, light fastness and storage stability of a ink sheet according to the manner as described below.

Examples 2 through 7

Dye providing materials-2 to 7 were prepared in the same manner as in Example 1, except that the azomethine dye, D-1 was replaced by D-4, D-7, D-8, D-16, D-25 or D-42. The dye providing materials each were overlapped on the image receiving material-1 and then, the image recording was conducted at the same condition as in Example 1 to obtain images-2 to 7. The thus-obtained images and dye providing materials each were evaluated in the same manner as in Example 1.

Example 8 and 9

Comparative dye providing materials-8 and 9 were prepared in the same manner as in Example 1, except that the was replaced by comparative dye A or B. These dye providing materials each were superposed on the image receiving material-1, then, the image recording was conducted in the same manner as in example 1 to obtain comparative images-8 and 9.

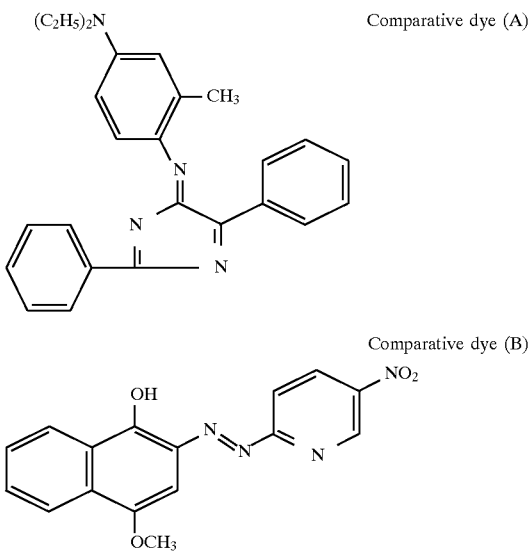

Comparative dye (A)

Comparative dye (B)

Evaluation and Method Thereof

Maximum Density

A maximum reflection density of the image (corresponding to a portion having a longest applying time) was measured by means of X-rite 310 TR.

Light Fastness

The transferred images each were subjected to exposure by Xenon Fade-O-meter over a period of 72 hrs. and the light fastness was evaluated in terms of dye residual ratio (%) represented by the following:

$(D/D_0) \times 100$ wherein $D_0$ and D represent densities before and after exposure, respectively.

Storage Stability of Dye Providing Material

The dye providing material was allowed to stand at 60° C. over a period of 100 hrs. to evaluate the storage stability.

When an image receiving material is rubbed with the ink layer after storage, no occurrence of dye transfer refers to A; slight occurrence, B; and remarkable occurrence, C.

TABLE 1

| Example | Dye | Dmax. | Light fastness (%) | Storage stability | Remarks |
|---|---|---|---|---|---|
| 1 | D-1 | 2.21 | 93 | A | Inv. |
| 2 | D-4 | 2.23 | 91 | A | Inv. |
| 3 | D-7 | 2.13 | 90 | A | Inv. |
| 4 | D-8 | 1.96 | 87 | A | Inv. |
| 5 | D-16 | 2.11 | 92 | A | Inv. |
| 6 | D-25 | 2.15 | 90 | A | Inv. |
| 7 | D-42 | 2.07 | 88 | A | Inv. |
| 8 | A | 2.03 | 38 | C | Comp. |
| 9 | B | 1.61 | 67 | B | Comp. |

As can be seen from Table 1, using dyes excellent in storage stability, the image with sufficiently maximum density and excellent in light fastness can be obtained according to the thermal transfer recording material and thermal transfer recording method of the invention.

Examples 10 to 12

Image receiving materials 2 to 4 were prepared in the same manner as in Example 1, except that the metal ion-containing compound contained in the image receiving layer was replaced by a compound as shown below (M-1 to 3).

Subsequently, the dye providing material used in Example 1 was superposed on each of the image receiving materials-2 to 4 and the image recording was conducted in the same manner as in Example 1 to obtain image-10 to 12.

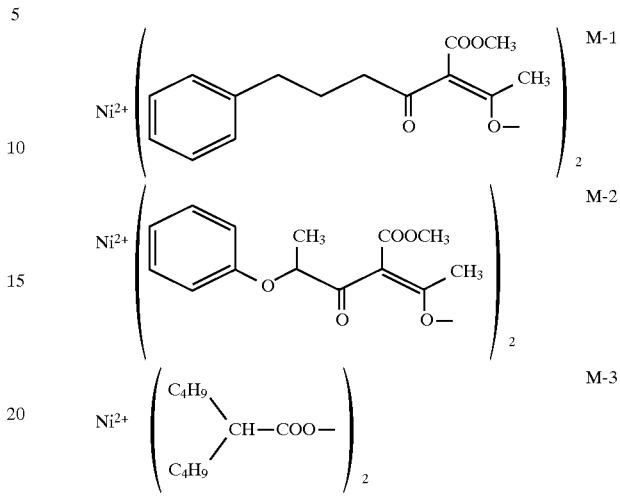

Example 13

A image receiving material-5 was prepared in the same manner as in Example 10, except that the metal ion-containing compound contained in the image receiving layer was removed. Thereafter, the dye providing material-1 used in Example 1 was superposed on the image receiving material-5 and the image recording was conducted in the same manner as in Example 1 to obtain an image-13, which was evaluated according to the manner afore-described.

Results of Example 10 to 13 were summarized in table 2.

TABLE 2

| Example | Metal ion compound | Dmax | Light fastness (%) | Remarks |
|---|---|---|---|---|
| 10 | M-1 | 2.20 | 93 | Inv. |
| 11 | M-2 | 2.18 | 90 | Inv. |
| 12 | M-3 | 2.18 | 92 | Inv. |
| 13 | none | 1.95 | 37 | Comp. |

As can be seen from Table 2, using a dye excellent in storage stability the image with sufficiently maximum density and excellent in light fastness can be obtained according to the thermal transfer recording material and method of the invention.

Example 14 and 15

On the PET base used as a support in Example 1, an ink layer containing an yellow image forming dye Y-1 (coating weight, 0.5 g/m$^2$), an ink layer containing a magenta image forming dye M-1 (coating weight, 0.5 g/m$^2$) and an ink layer containing, as a cyan imaging forming dye, azomethine dye D-7 (coating weight, 0.5 g/m$^2$) were coated in this order to prepare a dye providing material-10. Thereafter, the dye providing material-10 was superposed on the image receiving material-1 used in Example 1 and the full-color image recording was conducted by means of a full color printer CP3000D produced by Nikon (Example 14). Furthermore, comparative dye providing material-11 was prepared in the same manner as in Example 14, except that azomethine dye D-7 was replaced by comparative dye A used in Example 8 and the full-color recording was conducted. The obtained images and dye providing materials were evaluated in the same manner as in Example 1. Results thereof are summarized in Table 3.

TABLE 3

| Dye providing material | Dye | Dmax | Light fastness (%) | Storage stability | Remarks |
|---|---|---|---|---|---|
| 10 | D-7 | 2.10 | 89.0 | A | Inv. |
| 11 | A | 1.95 | 35.0 | C | Comp. |

As can be seen from Table 3, using a dye excellent in storage stability, the image with sufficiently maximum density and excellent in light fastness can be obtained through full-color recording, according to the thermal transfer recording material and method of the invention.

Example 16

On the dye providing material-10 or comparative dye providing material-11, was coated, as an interlayer, 100 ml of an aqueous solution containing the following compounds so as to have a coating weight of p-toluamide of 0.5 g/m$^2$.

| | |
|---|---|
| p-Toluamide (ball-milled dispersion) | 5 g |
| Polyvinyl pyrrolidone | 7 g |
| Gelatin | 3 g |
| Hardener H-1 | 0.3 g |

Further, on the interlayer was coated, by hot melt coating, a heat-fusible layer containing carnauba wax (coating weight, 2.0 g/m$^2$), the metal ion-containing compound used in Example 1 (coating weight, 1.0 g/m$^2$), UV absorbent UV-1 (coating weight, 0.1 g/m$^2$), antioxidant AO-1 (coating weight, 0.1 g/m$^2$) and ethylene-vinyl acetate copolymer (vinyl acetate content of 20%; coating weight, 0.2 g/m$^2$) to obtain thermal transfer recording materials (i) and (ii). These materials (i) and (ii) each were superposed on an image receiving material and the image recording was conducted by means of the full-color printer in the same manner as in Example 11, provided that, as the image receiving material, was used white plain paper.

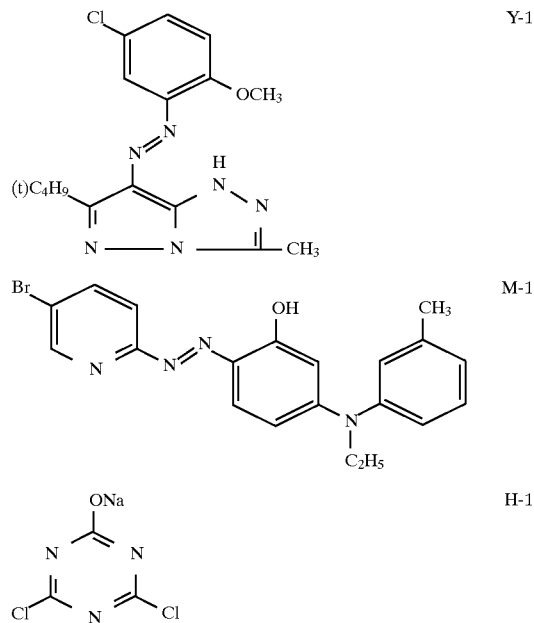

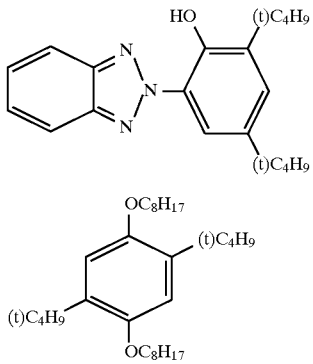

Results thereof are shown in Table 4.

TABLE 4

| Recording material | Dye | Dmax | Light fastness (%) | Storage stability | Remarks |
|---|---|---|---|---|---|
| (i) | D-7 | 2.08 | 92.0 | A | Inv. |
| (ii) | A | 1.94 | 36.0 | C | Comp. |

As can be seen from Table 4, even when using a thermal transfer recording material comprising an inventive ink layer provided thereon a heat-fusible layer, a full-color image with sufficient maximum density and excellent stability (light fastness) was obtained.

Example 17 through 21

Dye providing materials 17 to 21 were prepared in the same manner as in Example 1, except that azomethine dye D-1 was replaced by D-1, D-47, D-49, D-55, D-61 or D-66. Each of these dye providing materials was superposed on the image receiving material-1 and then, the image recording was conducted in the same manner as in example 1 to obtain images-17 to 21. Thus-obtained images and dye providing materials were evaluated in the same manner as in Example 1.

Example 22 and 23

Comparative dye providing materials-22 and 23 were prepared in the same manner as in Example 1, except that the dye was replaced by comparative dye-22 or 23, and then, the image recording was conducted in the same manner as in Example 1 to obtain images-22 and 23. Thus-obtained images and dye providing materials were evaluated in the same manner as in Example 1.

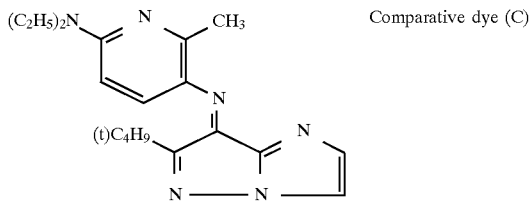

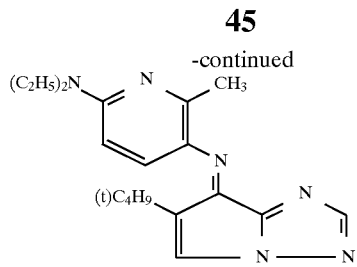

Comparative dye (D)

Results of Examples 17 to 23 are shown in Table 5.

TABLE 5

| Example | Dye | Dmax | Light fastness (%) | Storage stability | Remarks |
| --- | --- | --- | --- | --- | --- |
| 17 | D-47 | 2.09 | 92 | A | Inv. |
| 18 | D-49 | 2.05 | 93 | A | Inv. |
| 19 | D-55 | 2.12 | 89 | A | Inv. |
| 20 | D-61 | 1.98 | 90 | A | Inv. |
| 21 | D-66 | 2.07 | 91 | A | Inv. |
| 22 | C | 2.04 | 52 | C | Comp. |
| 23 | D | 1.96 | 48 | C | Comp. |

As can be seen from Table 5, using dyes with excellent storage stability, images with sufficient maximum density and excellent light fastness can be obtained according to the thermal transfer recording material and method of the invention.

What is claimed is:

1. A thermal transfer recording material comprising a dye providing material including a support having thereon an ink layer containing an azomethine dye of the following formula (1) and either (1) an image receiving material comprising a support having thereon an image receiving layer containing a metal ion-containing compound or (2) a heat fusible layer on said ink layer containing said metal ion-containing compound

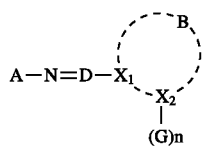

Formula (1)

wherein A represents an aromatic hydrocarbon ring or heterocyclic ring; D represents a nitrogen-containing heterocyclic ring; B represents a non-metallic atom group necessary for forming an aromatic hydrocarbon ring or heterocyclic ring; $X_1$ and $X_2$ independently represent a carbon or nitrogen atom; and n is 1 when $X_2$ is a carbon atom and n is 0 when $X_2$ is a nitrogen atom; G represents a hydrogen atom, an amino group, hydroxy group, alkoxy group, acylamino group, alkylureido group, arylureido group, alkylsulfonamido group, arylsulfonamido group, alkylaminosulfonylamino group or arylaminosulfonylamino group.

2. The thermal transfer recording material of claim 1, wherein, in the formula (1), B represents a non-metallic atom group necessary for forming a nitrogen-containing heterocyclic ring and $X_2$ is a nitrogen atom, which is bonded to $X_1$.

3. The thermal transfer recording material of claim 1, wherein said azomethine dye is represented by the following formulas (2) to (5),

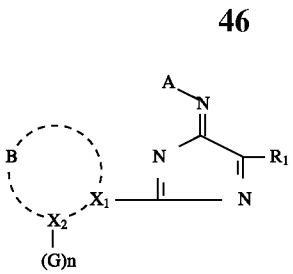

formula (2)

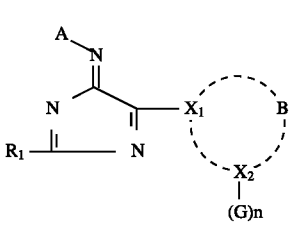

formula (3)

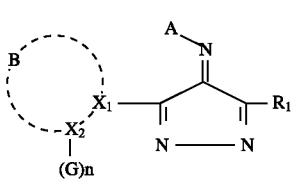

formula (4)

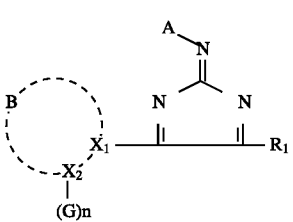

formula (5)

wherein $R_1$ is a hydrogen atom or univalent organic group.

4. The thermal transfer recording material of claim 1, wherein said azomethin dye is represented by the following formulas (6) to (9),

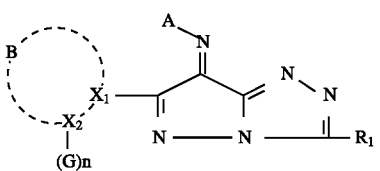

formula (6)

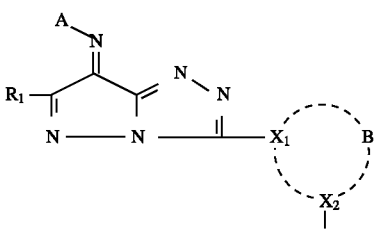

formula (7)

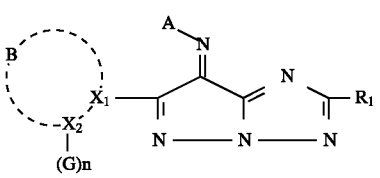

formula (8)

-continued

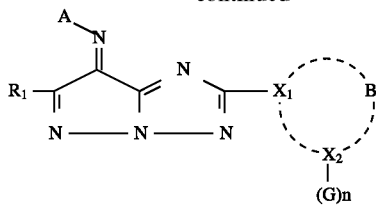

formula (9)

wherein $R_1$ represents a hydrogen atom or a univalent organic group.

5. The thermal transfer recording material of claim 1, wherein said azomethine dye is represented by the following formula (10),

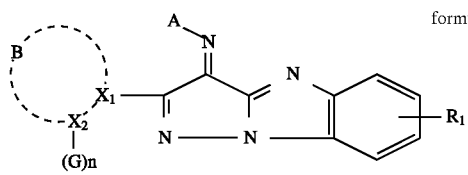

formula (10)

wherein $R_1$ represents a hydrogen atom or a univalent organic group.

6. The thermal transfer recording material of claim 1, wherein said azomethine dye is represented by the following formula (11),

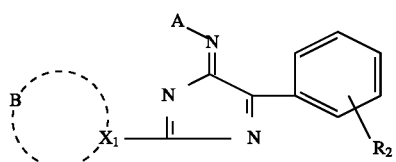

formula (11)

wherein B' represents a nitrogen-containing heterocyclic ring and $R_2$ represents a hydrogen atom or a univalent organic group.

7. The thermal transfer recording material claim 1, wherein said azomethine dye is represented by the following formulas (12) to (17),

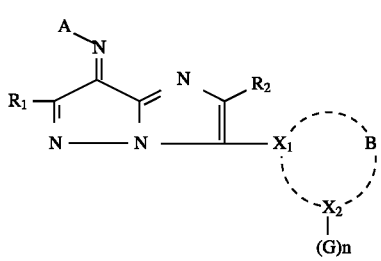

formula (12)

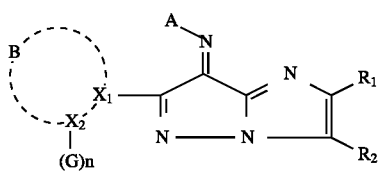

formula (13)

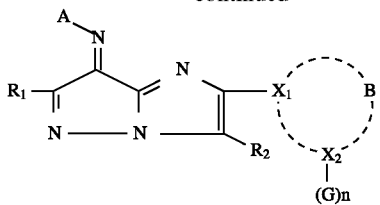

formula (14)

formula (15)

formula (16)

formula (17)

wherein $R_1$ and $R_2$ independently represent a hydrogen atom or a univalent organic group.

8. A thermal transfer recording method comprising the steps of
(i) superposing a dye-providing material comprising a support having thereon an ink layer containing an azomethine dye, on an image receiving material comprising a support having thereon an image receiving layer containing a metal ion-containing compound so that the ink layer is in contact with the image receiving layer,
(ii) applying heat imagewise to the dye-providing material and
(iii) peeling the dye providing material from the image receiving material;
wherein said azomethine dye is represented by the following formula (1),

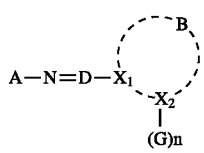

formula (1)

wherein A represents an aromatic hydrocarbon ring or heterocyclic ring; D represents a nitrogen-containing heterocyclic ring; B represents a non-metallic atom group necessary for forming an aromatic hydrocarbon ring or heterocyclic ring; $X_1$ and $X_2$ independently represent a carbon or nitrogen atom; and n is 1 when $X_2$ is a carbon atom and n is 0 when $X_2$ is a nitrogen atom; G represents a hydrogen atom, an amino group, hydroxy group, alkoxy group, acylamino group, alkylureido group, arylureido group, alkylsulfonamido group, arylsulfonamido group, alkylaminosulfonylamino group or arylaminosulfonylamino group.

9. The thermal transfer recording method of claim 8, wherein, in the formula (1), B represents a non-metallic atom group necessary for forming a nitrogen-containing heterocyclic ring and $X_2$ is a nitrogen atom, which is bonded to $X_1$.

10. The thermal transfer recording method of claim 8, wherein said azomethin dye is represented by the following formulas (2) to (5),

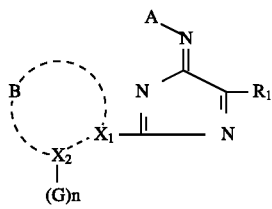
formula (2)

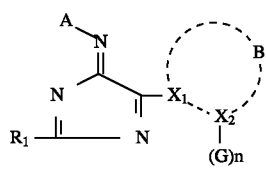
formula (3)

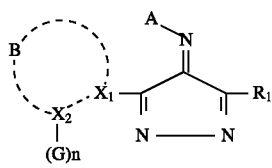
formula (4)

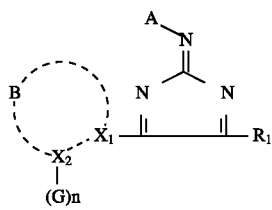
formula (5)

wherein A, B, $X_1$, $X_2$, n and G each have the same definition as in claim 8; and $R_1$ is a hydrogen atom or univalent organic group.

11. The thermal transfer recording method of claim 8, wherein said azomethin dye is represented by the following formulas (6) to (9),

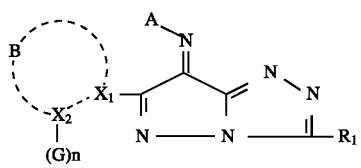
formula (6)

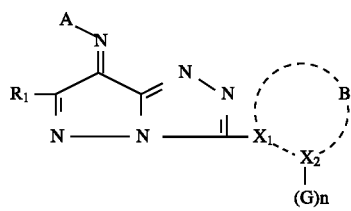
formula (7)

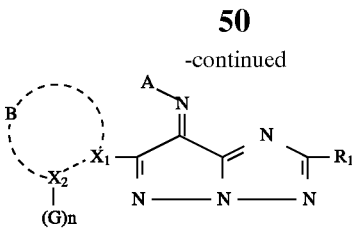
formula (8)

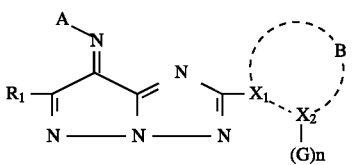
formula (9)

wherein A, B, $X_1$, $X_2$, n and G each have the same definition as in claim 8; and $R_1$ represents a hydrogen atom or a univalent organic group.

12. The thermal transfer recording method of claim 8, wherein said azomethine dye is represented by the following formula (10),

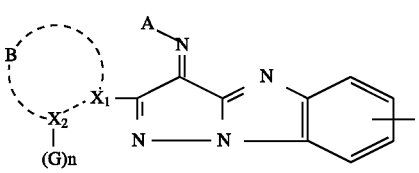
formula (10)

wherein A, B, $X_1$, $X_2$, n and G each have the same definition as in claim 8; $R_1$ represents a hydrogen atom or a univalent organic group.

13. The thermal transfer recording method of claim 8, wherein said azomethine dye is represented by the following formula (11),

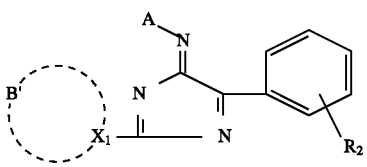
formula (11)

wherein A and $X_1$ each have the same definition as in claim 8; B' represents a nitrogen-containing heterocyclic ring and $R_2$ represents a hydrogen atom or a univalent organic group.

14. The thermal transfer recording method claim 8, wherein said azomethin dye is represented by the following formulas (12) to (17),

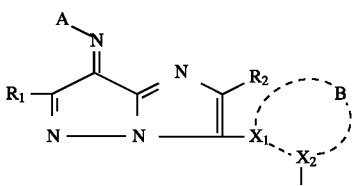
formula (12)

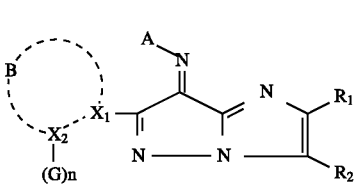
formula (13)

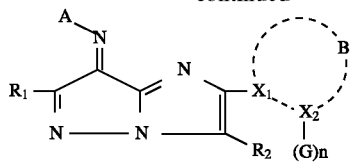

formula (14)

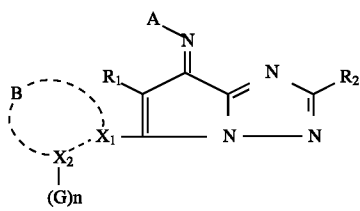

formula (15)

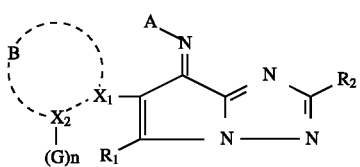

formula (16)

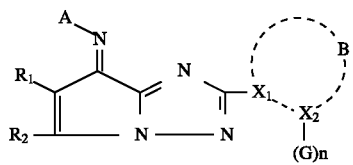

formula (17)

wherein A, B, $X_1$, $X_2$, n and G each have the same definition as in claim 8; $R_1$ and $R_2$ independently represent a hydrogen atom or a univalent organic group.

15. A thermal transfer recording method comprising
(i) superposing a thermal transfer recording material comprising a support having thereon an ink layer containing the azomethine and further thereon a heat-fusible layer containing a metal ion-containing compound, on an image receiving material so that the heat-fusible layer is in contact with the image receiving material,
(ii) applying heat imagewise to the thermal transfer recording material and
(iii) peeling the thermal transfer recording material apart from the image receiving material; wherein said azomethine dye is represented by the following formula (1),

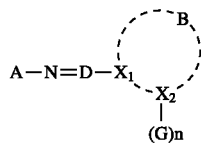

formula (1)

wherein A represents an aromatic hydrocarbon ring or heterocyclic ring; D represents a nitrogen-containing heterocyclic ring; B represents a non-metallic atom group necessary for forming an aromatic hydrocarbon ring or heterocyclic ring; $X_1$ and $X_2$ independently represent a carbon or nitrogen atom; and n is 1 when $X_2$ is a carbon atom and n is 0 when $X_2$ is a nitrogen atom; G represents a hydrogen atom, an amino group, hydroxy group, alkoxy group, acylamino group, alkylureido group, arylureido group, alkylsulfonamido group, arylsulfonamido group, alkylaminosulfonylamino group or arylaminosulfonylamino group.

16. The thermal transfer recording method of claim 15, wherein, in the formula (1), B represents a non-metallic atom group necessary for forming a nitrogen-containing heterocyclic ring and $X_2$ is a nitrogen atom, which is bonded to $X_1$.

17. The thermal transfer recording method of claim 15, wherein said azomethin dye is represented by the following formulas (2) to (5),

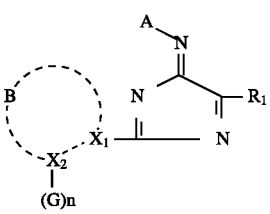

formula (2)

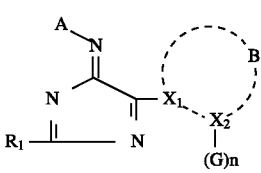

formula (3)

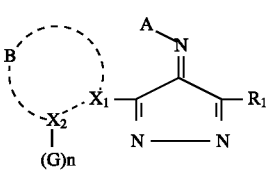

formula (4)

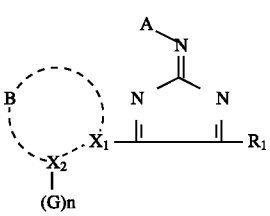

formula (5)

wherein A, B, $X_1$, $X_2$, n and G each have the same definition as in claim 15; and $R_1$ is a hydrogen atom or univalent organic group.

18. The thermal transfer recording method of claim 15, wherein said azomethin dye is represented by the following formulas (6) to (9),

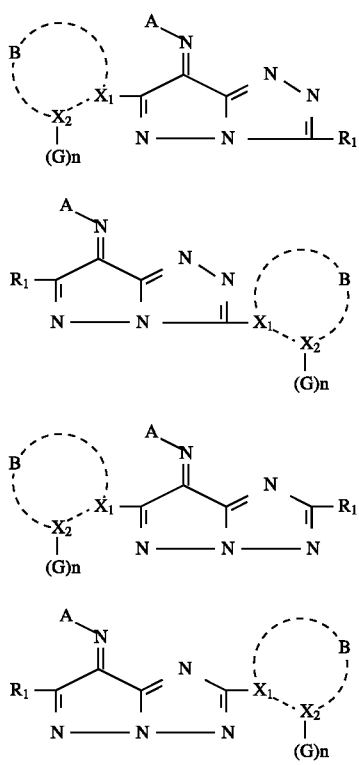

formula (6)

formula (7)

formula (8)

formula (9)

wherein A, B, $X_1$, $X_2$, n and G each have the same definition as in claim 15; and $R_1$ represents a hydrogen atom or a univalent organic group.

19. The thermal transfer recording method of claim 15, wherein said azomethine dye is represented by the following formula (10), formula (10)

wherein A, B, $X_1$, $X_2$, n and G each have the same definition as in claim 15; $R_1$ represents a hydrogen atom or a univalent organic group.

20. The thermal transfer recording method of claim 15, wherein said azomethine dye is represented by the following formula (11),

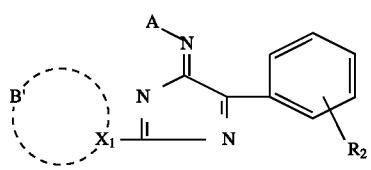

formula (11)

wherein A and $X_1$ each have the same definition as in claim 15; B' represents a nitrogen-containing heterocyclic ring and $R_2$ represents a hydrogen atom or a univalent organic group.

21. The thermal transfer recording method claim 15, wherein said azomethin dye is represented by the following formulas (12) to (17),

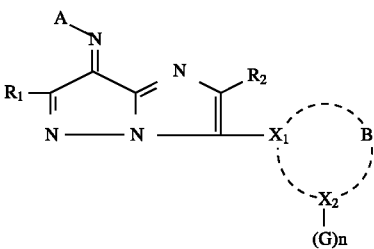

formula (12)

formula (13)

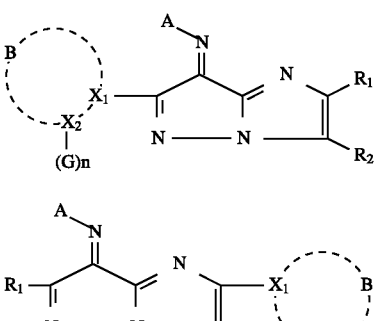

formula (14)

formula (15)

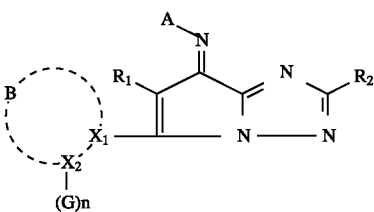

formula (16)

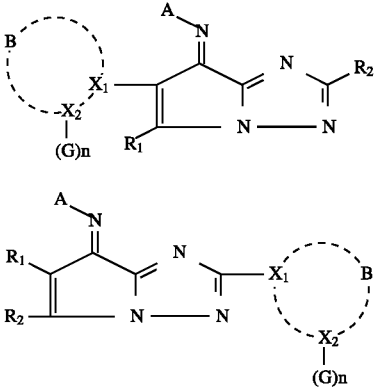

formula (17)

wherein A, B, $X_1$, $X_2$, n and G each have the same definition as in claim 15; $R_1$ and $R_2$ independently represent a hydrogen atom or a univalent organic group.

* * * * *